United States Patent
Dotson

(10) Patent No.: US 6,562,890 B2
(45) Date of Patent: May 13, 2003

(54) DISODIUM HEXAHYDROPHTHALATE SALT COMPOSITIONS AND NUCLEATED POLYMERS COMPRISING SUCH COMPOSITIONS

(75) Inventor: Darinl L. Dotson, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/820,578

(22) Filed: Mar. 29, 2001

(65) Prior Publication Data

US 2003/0027909 A1 Feb. 6, 2003

(51) Int. Cl.$^7$ .......................... C08K 5/098; C08K 3/22
(52) U.S. Cl. .................. 524/396; 524/374; 524/436; 524/437
(58) Field of Search ................................ 524/396, 394, 524/436, 437; 252/182.28

(56) References Cited

U.S. PATENT DOCUMENTS

| | | | | |
|---|---|---|---|---|
| 3,207,735 A | | 9/1965 | Wijga | 524/287 |
| 3,207,736 A | | 9/1965 | Wijga | 524/295 |
| 3,207,737 A | | 9/1965 | Wales | 524/396 |
| 3,207,738 A | | 9/1965 | Wijga | 524/285 |
| 3,207,739 A | | 9/1965 | Wales | 524/396 |
| 5,597,786 A | * | 1/1997 | Itoh et al. | 508/506 |
| 6,300,415 B1 | * | 10/2001 | Okayama et al. | 525/191 |
| 6,316,571 B1 | * | 11/2001 | Van Kruchten | 526/9.5 |

OTHER PUBLICATIONS

Beck, H. N., "Heterogeneous Nucleating Agents for Polypropylene Crystallization", *Journal of Applied Polymer Science*, vol. 11, pp. 673–685 (1967).

* cited by examiner

*Primary Examiner*—Peter Szekely
(74) *Attorney, Agent, or Firm*—Terry T. Moyer; William S. Parks

(57) ABSTRACT

Compositions comprising specific disodium hexahydrophthalate(HHPA) salts in combination with acid scavengers (such as organic calcium salts or dihydrotalcite complexes) that provide highly desirable and effective nucleating properties within polymer articles (such as polyolefins) are provided. Surprisingly, such a combination of HHPA salt and acid scavenger provides high crystallization temperatures, low haze, and/or high flexural modulus to the finished polymer product. Other sodium salt polymer nucleators (such as sodium benzoate) deleteriously react with calcium organic salt acid scavengers such that characteristically high crystallization temperatures are drastically reduced when in combination with calcium salts (such as calcium stearate). Also, sodium benzoate when combined with dihydrotalcite acid scavengers produce extremely high haze levels in the finished target polymer article, whereas the inventive compositions surprisingly reduce haze. The finished polymer articles comprising such an inventive composition are also contemplated within this invention.

19 Claims, No Drawings

DISODIUM HEXAHYDROPHTHALATE SALT COMPOSITIONS AND NUCLEATED POLYMERS COMPRISING SUCH COMPOSITIONS

FIELD OF THE INVENTION

This invention relates to compositions comprising specific disodium salts of hexahydrophthalic acid (HHPA) in combination with acid scavengers (such as organic calcium salts or dihydrotalcite complexes) that provide highly desirable and effective nucleating properties within polymer articles (such as polyolefins). Surprisingly, such a combination of a disodium HHPA salt and acid scavenger provides high crystallization temperatures, low haze, and high flexural modulus to the finished polymer product. Other sodium salt polymer nucleators (such as sodium benzoate and NA-11) deleteriously react with calcium organic salt acid scavengers such that characteristically high crystallization temperatures are drastically reduced when in combination with calcium salts (such as calcium stearate). Also, sodium benzoate, when combined with dihydrotalcite (DHT4-A) acid scavengers produce extremely high haze levels in the finished target polymer article, whereas the inventive compositions surprisingly reduce haze. The finished polymer articles comprising such an inventive composition are also contemplated within this invention.

BACKGROUND OF THE PRIOR ART

All U.S. patents cited below are herein fully incorporated by reference.

As used herein, the term "thermoplastic" is intended to mean a polymeric material that will melt upon exposure to sufficient heat but will retain its solidified state, but not prior shape without use of a mold or like article, upon sufficient cooling. Specifically, as well, such a term is intended solely to encompass polymers meeting such a broad definition that also exhibit either crystalline or semi-crystalline morphology upon cooling after melt-formation. Particular types of polymers contemplated within such a definition include, without limitation, polyolefins (such as polyethylene, polypropylene, polybutylene, and any combination thereof), polyamides (such as nylon), polyurethanes, polyesters (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, crystalline morphology uniformity is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than unnucleated polyolefins. Such crystallization at higher temperatures results in reduced fabrication cycle times and a variety of improvements in physical properties, such as, as one example, stiffness.

Such compounds and compositions that provide faster and/or higher polymer crystallization temperatures are thus popularly known as nucleators. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The more uniform, and preferably smaller, the crystal size, the less light is scattered. In such a manner, the clarity of the thermoplastic article itself can be improved. Thus, thermoplastic nucleators are very important to the thermoplastic industry in order to provide enhanced clarity, physical properties and/or faster processing.

As an example of one type of nucleator, dibenzylidene sorbitol (DBS) compounds are common, particularly for polypropylene end-products. Compounds such as 1,3-O-2, 4-bis(3,4-dimethylbenzylidene) sorbitol (hereinafter DMDBS), available from Milliken Chemical under the trade name Millad® 3988, provide excellent nucleation characteristics for target polypropylenes and other polyolefins. Other well known compounds include sodium benzoate, sodium 2,2'-methylene-bis-(4,6-di-tert-butylphenyl) phosphate (from Asahi Denka Kogyo K.K., known as NA-11), aluminum bis[2,2'-methylene-bis-(4,6-di-tert-butylphenyl) phosphate] (also from Asahi Denka Kogyo K.K., known as NA-21), talc, and the like. Such compounds all impart high polyolefin crystallization temperatures; however, each also exhibits its own drawback for large-scale industrial applications.

For example, although disodium hexahydrophthalate has been taught within U.S. Pat. No. 3,207,739 to Wales, as well as within Beck, H. N., "Heterogeneous Nucleating Agents for Polypropylene Crystallization," *Journal of Applied Polymer Science*, Vol. 11, pp. 673–685 (1967), as a possible, though not preferred, nucleator for polymers, such disclosures are directed more specifically to sodium benzoate and other like aromatic compounds as better nucleators. Furthermore, neither reference discusses the presence of any acid scavenger compounds other than the salts themselves; in order to provide any effective dual function of acid scavenger and nucleator, these references require very high addition amounts of such salts within the target polymer (in both instances homopolymer polypropylene). There is no discussion of the utilization of such compounds (which range from the preferred sodium benzoate to the possible, much less desired disodium salts of cycloaliphatic dicarboxylic acids) in combination with any acid scavengers in order to retain the amount of nucleator present within the polymer melt or within the finished article.

Of great interest to this invention is the compatibility of nucleators with different acid scavenger additives widely used within typical thermoplastic (e.g., polyolefins, such as polypropylene, polyethylene, and the like, polyesters, such as polyethylene terephthalate) and thermoset (e.g., polyurethanes, and the like) articles. For instance, calcium stearate, being a very popular, inexpensive acid scavenger and neutralizer present within typical polypropylene formulations to protect the end product from catalyst residue attack, is utilized or greatly desired as a component within polypropylene and other polyolefin formulations. Unfortunately, compatibility between such a calcium salt and sodium-based nucleators is highly questionable. Utilizing sodium benzoate or NA-11 without acid scavenger in polypropylene compositions, albeit at high levels, results in a relatively high peak crystallization temperature for adequate, effective nucleation. However, acid scavengers are necessary to protect the stabilizing additives, such as antioxidants and light stabilizers, from acidic catalyst residue attack during polymer processing. Thus, such acid scavengers must be present. When sodium benzoate or NA-11 is added in combination with calcium stearate (or other calcium organic salts) the resultant polymer crystallization temperature is reduced significantly (about 3–4° C.) from that of the polymer when the nucleator is used without acid scavenger, thereby rendering the nucleation capability of the sodium-based compounds nearly ineffective and certainly well below the performance required of such compounds. When no acid scavenger is used, however, much higher use levels of nucleator are required, and while the said nucleator may still give desirable performance in terms of higher crystallization temperatures, much of the active nucleator is consumed by acid scavenger, and plate-out and blooming often results. Regarding calcium stearate compatibility, it is not known specifically why this phenomenon occurs, however, it is speculated (without intending to be bound to any particular scientific theory) that the calcium and sodium ions exchange places in their respective compounds. Thus, with the reduction of the amount of sodium benzoate and sodium arylphosphate salts from the target polyolefin composition, invariably the nucleation capabilities of such compounds are drastically reduced.

Other problems encountered with the standard nucleators noted above include a lack of providing stiffness qualities to the target polyolefin article. As noted above, uniformity in polyolefin production is paramount to large-scale production. If the resultant article does not exhibit adequate crystallinity, the entire article itself will suffer from a lack of rigidity and thus will be too weak to provide an effective composite article for certain uses.

Other problems encountered with the standard nucleators noted above include inconsistent nucleation due to dispersion problems, resulting in stiffness and impact variation in the polyolefin article. Substantial uniformity in polyolefin production is highly desirable because it results in relatively uniform finished polyolefin articles. If the resultant article does not contain a well-dispersed nucleating agent, the entire article itself may suffer from a lack of rigidity and low impact strength.

Furthermore, storage stability of nucleator compounds and compositions is another potential problem with thermoplastic nucleators and thus is of enormous importance as well. Since nucleator compounds are generally provided in powder or granular form to the polyolefin manufacturer, and since uniform small particles of nucleating agents is imperative to provide the requisite uniform dispersion and performance, such compounds must remain as small particles through storage. Certain nucleators, such as sodium benzoate, exhibit high degrees of hygroscopicity such that the powders made therefrom hydrate easily resulting in particulate agglomeration. Such agglomerated particles may require further milling or other processing for deagglomeration in order to achieve the desired uniform dispersion within the target thermoplastic. Furthermore, such unwanted agglomeration due to hydration may also cause feeding and/or handling problems.

These noticeable problems have thus created a long-felt need in the polyolefin nucleator compound industry to provide such compounds that do not exhibit the aforementioned problems and provide excellent peak crystallization temperatures for the target polyolefins themselves. To date, the best compounds for this purpose remain those noted above. However, nucleators exhibiting exceptionally high peak crystallization temperatures, low hygroscopicity properties, high stiffness capabilities within certain target polyolefins, and compatibility with most highly desired polyolefin acid scavengers (such as, most importantly, calcium organic salts), have not been accorded the polymer industry.

OBJECTS OF THE INVENTION

Therefore, an object of the invention is to provide a sodium salt nucleator and compositions thereof that exhibit excellent acid scavenger compatibility within target thermoplastic articles and formulations. A further object of the invention is to provide a polyolefin nucleating agent that provides excellent high peak crystallization temperatures to polypropylene articles and formulations and also exhibits extremely low hygroscopicity in order to accord an extremely good shelf-stable additive composition. Another object of the invention is to provide a nucleator compound that behaves in such a manner within the target polyolefin such that the resultant crystalline morphology is more uniform in comparison with other nucleated polypropylene articles and formulations which contain said polyolefin exhibit very high stiffness properties. Additionally, it is an object of this invention to provide a nucleator compound or compositions which may be used in various polyolefin media for myriad end-uses.

Accordingly, this invention encompasses compositions of at least one acid scavenger compound and at least one metal salt conforming to the structure of Formula (I)

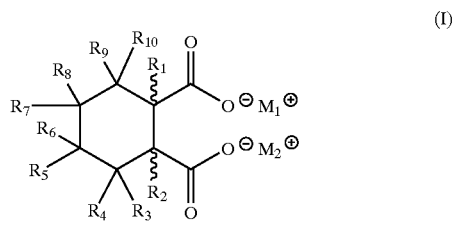

(I)

wherein $M_1$ and $M_2$ are individually selected from the group consisting of sodium and hydrogen, wherein at least one of said $M_1$ and $M_2$ is sodium, wherein $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, $C_1$–$C_9$ alkylamine, halogens (fluorine, chlorine, bromine, and iodine), and phenyl; wherein if such groups are alkyl, any two vicinal or geminal alkyl groups may be combined to form a carbocyclic ring of up to six carbon atoms; wherein said compound is either in a trans or cis configuration, cis being preferred; and wherein said acid scavenger is a compound other than at least one conforming to the structure of Formula (I). Examples of acid scavengers include calcium stearate, calcium lactate, calcium stearoyl-2 lactylate, calcium carbonate, calcium hydroxide, sodium stearate, lithium stearate, zinc stearate, dihydrotalcite (DHT4-A), and diatomaceous earth. Thermoplastic compositions comprising such a combination of compounds are also encompassed within this invention.

The inventive disodium HHPA salt/acid scavenger compositions provide excellent crystallization temperatures, stiffness, and clarity within target thermoplastics (such as polyolefins). Also, such compounds exhibit very low hygroscopicity and therefore excellent shelf stability as powdered or granular formulations.

DETAILED DESCRIPTION OF THE INVENTION

As noted above, in order to develop a proper polyolefin nucleator composition comprising an acid scavenger for industrial applications, a number of important criteria needed to be met. The inventive compositions comprising sodium HHPA salts and other acid scavengers meet all of these important requirements very well. For instance, as noted above, cis-disodium HHPA salts do not hydrate readily and thus granular or powder formulations of such a salt do not agglomerate or clump together. The cost benefits from such shelf stability are apparent since there is little if no need to separate any agglomerated powders upon introduction within the polyolefin manufacturing machinery. Furthermore, as discussed in greater detail below, these inventive sodium HHPA salts (either trans- or cis- in stereochemistry) provide excellent high peak crystallization temperatures in a variety of polyolefin formulations, particularly within random copolymer polypropylene (hereinafter RCP) and homopolymer polypropylene (hereinafter HP). Additionally, such inventive compositions provide outstanding crystalline uniformity within the target articles when combined with acid scavengers (most particularly those of calcium organic salts), thereby according high stiffness characteristics to the overall final polyolefin product without the need for extra fillers and rigidifying additives. In each of these criteria, the important characteristic of the sodium HHPA salts is the lack of deleterious reaction when in the presence of calcium organic salt acid scavengers which are, again, readily available and very inexpensive, and thus are the most highly desired acid scavengers for utilization within nucleated polyolefin compositions and articles. Such a mix of desirable properties for such an inventive composition is thus highly unexpected and unpredictable. Such sodium (more particularly, disodium) HHPA salts thus provide excellent nucleating capability to polyolefins on an industrial scale specifically in the presence of acid scavengers.

The disodium HHPA salts are thus added within the target polyolefin in an amount from about 0.02 to about 2.0 percent by weight, more preferably 0.02 to 1.5 percent by weight, most preferably 0.05 to 1.0 percent by weight, in order to provide the aforementioned beneficial characteristics. A masterbatch containing up to 50% or more of the active nucleating agent may also be beneficial, although not a restriction. The required acid scavenger is thus present in amounts of from about 0.01 to about 1.0 percent by weight within the same formulation. Examples of such acid scavengers are calcium stearate, calcium lactate, calcium stearoyl-2 lactylate, lithium stearate, aluminum stearate, zinc stearate, and sodium stearate, and dihydrotalcite. Other optional additives within the inventive compositions, or within the final polyolefin article made therewith, may include plasticizers, antioxidants, antimicrobial agents (such as silver-based compounds, preferably ion exchange compounds such as ALPHASAN® antimicrobials from Milliken & Company), antistatic agents (such as stearate esters of glycerin), stabilizers, ultraviolet absorbers, flame retardants, blowing agents, and other similar standard polyolefin thermoplastic additives. Other additives may also be present within this composition, most notably dispersing aids such as polyolefin waxes, fatty acid waxes (like montan waxes), fatty amides, and mineral oil.

The term polyolefin or polyolefin resin is intended to encompass any materials comprised of at least one polyolefin compound. Preferred examples include isotactic and syndiotactic polypropylene, polyethylene, poly(4-methyl) pentene, polybutylene, and any blends or copolymers thereof, whether high or low density in composition. The polyolefin polymers of the present invention may include aliphatic polyolefins and copolymers made from at least one aliphatic olefin and one or more ethylenically unsaturated comonomers. Generally, the comonomers, if present, will be provided in a minor amount, e.g., about 10 percent or less or even about 5 percent or less, based upon the weight of the polyolefin (e.g., random copolymer polypropylene, or RCP). Such comonomers may serve to assist in clarity improvement of the polyolefin, or they may function to improve other properties of the polymer, such as impact strength. As an example, when up to 25% or more of comonomer is used (such as ethylene), the impact strength is drastically increased (e.g., propylene/ethylene impact copolymer, or ICP). Other polymers or rubber (such as EPDM or EPR) may also be compounded with the polyolefin. Other comonomer examples include acrylic acid and vinyl acetate, etc. Examples of olefin polymers whose transparency and crystallization temperature can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as, without limitation, polyethylene, linear low density polyethylene, isotactic polypropylene (I-PP), syndiotactic polypropylene (s-PP) crystalline ethylene/propylene copolymer (such as RCP and ICP), poly(1-butene), poly(4-methyl)pentene, poly(1-hexene), poly(1-octene), and poly(vinyl cyclohexene). The polyolefins of the present invention may be described as basically linear, regular polymers that may optionally contain side chains such as are found, for instance, in conventional, low density polyethylene (LDPE). Although polyolefins are preferred thermoplastics, the nucleating agents of the present invention are not restricted to polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, any thermoplastic composition having some degree of crystalline content may be improved with the nucleating agent/acid scavenger composition of the current invention.

The compositions of the present invention may be obtained by adding the inventive HHPA salt (or combination of salts or composition comprising such salts) and the acid scavenger to the thermoplastic polymer or copolymer and merely mixing the resultant composition by any suitable means. The composition may then be processed and fabricated by any number of different techniques, including, without limitation, injection molding, injection blow molding, injection stretch blow molding, injection rotational molding, extrusion, extrusion blow molding, sheet extrusion, film extrusion, cast film extrusion, foam extrusion, thermoforming (such as into films, blown-films, biaxially oriented films), thin wall injection molding, and the like into a fabricated article.

The nucleated thermoplastic is intended to be utilized as, for instance and not by limitation, medical devices, such as pre-filled syringes for retort applications, intravenous supply containers, and blood collection apparatuses; food packages; liquid containers, such as for drinks, medicines, shampoos, and the like; apparel cases; microwaveable articles; shelves; cabinet doors; mechanical parts; automobile parts; sheet; pipes and tubes; rotationally molded products; blow-molded products; fiber (spun or nonwoven); compression molded products; basically any thermoplastic or article wherein the effects of nucleation may be advantageous.

PREFERRED EMBODIMENTS OF THE INVENTION

Examples of particularly preferred HHPA salts within the scope of the present invention are presented below.

PRODUCTION OF DISODIUM HHPA SALTS

EXAMPLE 1

Cis-Disodium HHPA

To a 250-mL Erlenmeyer flask with a magnetic stirrer was added water (100 mL), sodium hydroxide (10.38 g, 260 mmol), and cis-hexahydrophthalic anhydride (20 g, 130 mmol). The reaction mixture was stirred at room temperature until homogeneous, at which time a slight exotherm was observed. After stirring for three hours, the solution was poured into acetone (2 L), and the white solid collected via suction filtration. Drying in a vacuum oven at 110° C. gave 20.9 g (74%) as a white powder, mp>350° C. IR and NMR analysis were consistent with that of the expected product.

EXAMPLE 2 trans-Disodium HHPA

To a 1-L Erlenmeyer flask with a magnetic stirrer was added acetone (500 mL) and trans-1,2-cyclohexanedicarboxylic acid 17.2 g (100 mmol) with stirring at room temperature. To this slurry was added a solution of sodium hydroxide (18 g, 450 mmol) in water (50 mL), at which time a thick white precipitate formed. After stirring a further 2 hours, the white solid was collected via suction filtration, washed with acetone (200 mL) and water (20 mL), and dried in a vacuum oven at 100° C. to give a white powder (dry weight=17.3 g, 80% yield), mp>400° C. IR and NMR analysis were consistent with that of the expected product.

Production of Inventive Compositions and Nucleated Polyolefins with Such Compositions Thermoplastic compositions (plaques) were produced comprising the compounds from the EXAMPLES combined with certain acid scavenger compounds. Such mixtures were formulated through the simple introduction of such compounds as individual powders within a larger mixture including a target polyolefin. The components were then melted together and more thoroughly mixed during extrusion and subsequently processed further through injection molding to form the desired articles (in this instance, 50 mil plaques). It should be noted that although powdered forms of the components were mixed to form the invention compositions, compacted or extruded pellets, prills, and the like, as well as liquids comprising the inventive compositions may also be utilized for the desired thermoplastic or thermoset article. Thus, the inventive salt/acid scavenger compositions were prepared according to the following table (1 kg batches):

| HOMOPOLYMER POLYPROPYLENE COMPOSITION TABLE | |
| --- | --- |
| Component | Amount |
| Polypropylene homopolymer (Himont Profax 6301, 12 MFR) | 1000 g |
| Irganox ® 1010, Primary Antioxidant (from Ciba) | 500 ppm |
| Irgafos ® 168, Secondary Antioxidant (from Ciba) | 1000 ppm |
| Acid Scavenger (type noted below) | as noted |
| Disodium HHPA Salt | 2500 ppm |

The base resin (HP) and all additives were weighed and then blended in a Welex mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 2.54 cm and a length/diameter ratio of 24:1. Upon melting the molten polymer was filtered through a 60 mesh (250 micron) screen. Plaques of the target polypropylene were then made through extrusion into an Arburg 25 ton injection molder. The molder molder was set at a temperature anywhere between 190 and 260° C., with a range of 190 to 240° C. preferred, most preferably from about 200 to 230° C. The plaques had dimensions of about 51 mm×76 mm×1.27 mm, and each had a mirror finish. The mold cooling circulating water was controlled at a temperature of about 25° C.

Nucleation capabilities were measured as polymer recrystallization temperatures (which indicate the rate of polymer formation provided by the presence of the nucleating additive) by melting the target plaques, cooling the plaques at a rate of about 20° C./minute, and recording the temperature at which polymer reformation occurs. Flexural modulus testing (reported as 1% Secant Modulus) was performed on the above mentioned plaques using an MTS Sintech 1/S: 40" instrument with a span of 49 mm, a fixed deflection rate of 1.28 mm/min, a nominal sample thickness of 1.27 mm, and a nominal sample width of 50 mm in conformance with ASTM D790. The haze values were measured by ASTM Standard Test Method D1003-61 "Standard Test Method for Haze and Luminous Transmittance of Transparent Plastics" using a BYK Gardner XL-211 Hazemeter. Control plaques without nucleating additives, as well as with NA-11 and sodium benzoate, with and without calcium stearate (CS) and DHT4-A were also produced for comparative purposes for some or all of the above-noted measurements. Lithium stearate (LS) was also used as an acid scavenger in some samples. An asterisk (*) indicates no measurement was taken for that specific sample.

TABLE 1

Nucleation Performance of Inventive Salts from Structure (I) in Homopolymer Polypropylene

| Plaque # | Nucleator Added Ex. # from above | Acid Scavenger Added | $T_c$ (° C.) | Haze (%) | 1% Secant Modulus, MPa (Std. Dev.) |
| --- | --- | --- | --- | --- | --- |
| 3 | 1 | CS | 121 | 34 | 2022 (7) |
| 4 | 1 | LS | 118 | 56 | 2049 (12.2) |
| 5 | 1 | DHT4-A | 121 | 38 | 1963 (17.3) |
| 6 | 2 | CS | 120 | 45 | 1945 (9) |
| 7 | 2 | LS | 118 | 60 | 2043 (11.3) |
| 8 (Comparative) | 2 | DHT4-A | 121 | 57 | 2046 (15.4) |
| 9 | 1 | None | 118 | 66 | * |
| 10 | 2 | None | 117 | 53 | * |
| 11 | Sodium benzoate | None | 120 | 60 | * |
| 12 | Sodium benzoate | CS | 116 | 62 | * |
| 13 | NA-11 | None | 124 | 32 | * |
| 14 | NA-11 | CS | 120 | 48 | * |
| 15 (Control) | None | CS | 112 | 64 | 1691 (18) |

*CS = Calcium Stearate (800 ppm), LS = Lithium Stearate (800 ppm), DHT4-A = Hydrotalcite (400 ppm).

Thus, the inventive compositions comprising the disodium HHPA salts and acid scavengers exhibited more consistently high and/or at least increased peak crystallization temperatures for the inventive compositions as compared with the disodium HHPA salts alone. Both the sodium benzoate and NA-11 (sodium phospate-type ) nucleating agents exhibiting dramatic reductions in peak crystallization temperatures upon the introduction of calcium stearate. Furthermore, the inventive compositions exhibited lower haze than the comparative prior art nucleating agents and compositions, as well as very high flexural modulus measurements.

Hygroscopicity Testing

These tests were carried out on the milled products to give adequate surface area for moisture uptake. Two grams of each example were spread out on a watch glass and weighed immediately after drying in a vacuum oven. The samples were then placed in a controlled humidity (65%) environment and the weight was taken each day for 7 days. The percent weight gain was defined as the percent moisture uptake at 7 days. Table 2 below summarizes the results:

TABLE 2

Hygroscopicity of Compounds

| Example # | % Water Absorbed |
|---|---|
| 1 | 0.45 |
| 2 | 40.00 |
| sodium benzoate, comparative | 1.20 |

Thus, at least the cis-configuration of the disodium HHPA salt exhibited about a 67% improvement in hygroscopicity over that of the comparative sodium benzoate nucleating agent.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A composition comprising at least one acid scavenger compound and at least one metal salt conforming to the structure of Formula (I)

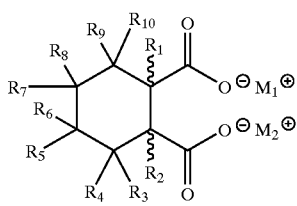

(I)

wherein $M_1$ and $M_2$ are both sodium, wherein $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, $C_1$–$C_9$ alkylamine, halogen, and phenyl;
wherein if such groups are alkyl, any two vicinal or geminal alkyl groups may be combined to form a carbocyclic ring of up to six carbon atoms;
wherein the carboxyl moieties of Formula (I) are present in cis configuration;
and wherein said acid scavenger is a compound other than said at least one metal salt conforming to the structure of Formula (I).

2. The composition of claim 1 wherein each of $R_1$, $R_2$, $R_3$, $R_4$, $R_5$, $R_6$, $R_7$, $R_8$, $R_9$, and $R_{10}$ are hydrogen and wherein said acid scavenger is at least a compound selected from the group consisting of carboxylate salts, dihydrotalcites, and any mixtures thereof.

3. The composition of claim 2 wherein said acid scavenger is at least one $C_{12}$–$C_{24}$ carboxylate salt.

4. The composition of claim 3 wherein said carboxylate salt is selected from the group consisting of sodium, lithium, calcium, and zinc.

5. The composition of claim 4 wherein said salt is calcium stearate.

6. A thermoplastic article comprising at least one thermoplastic polymer and the composition as defined in claim 1.

7. A thermoplastic article comprising at least one thermoplastic polymer and the composition as defined in claim 2.

8. A thermoplastic article comprising at least one thermoplastic polymer and the composition as defined in claim 3.

9. A thermoplastic article comprising at least one thermoplastic polymer and the composition as defined in claim 4.

10. A thermoplastic article comprising at least one thermoplastic polymer and the composition as defined in claim 5.

11. The thermoplastic article of claim 6 wherein said polymer comprises polypropylene.

12. The thermoplastic article of claim 10 wherein said polymer comprises polypropylene.

13. A polymer additive formulation comprising at least one composition defined in claim 1, wherein said additive composition is present in a form selected from the group consisting of a powder, a pellet, or a liquid, and wherein said composition also comprises at least one thermoplastic polymer, and, optionally, at least one compound selected from the group consisting of plasticizers, acid scavengers, antioxidants, antimicrobials, flame retardants, light stabilizers, antistatic agents, blowing agents, colored pigments, and any combination thereof.

14. A polymer additive formulation comprising at least one composition defined in claim 5, wherein said additive composition is present in a form selected from the group consisting of a powder, a pellet, or a liquid, and wherein said composition also comprises at least one thermoplastic polymer, and, optionally, at least one compound selected from the group consisting of plasticizers, acid scavengers, antioxidants, antimicrobials, flame retardants, light stabilizers, antistatic agents, blowing agents, colored pigments, and any combination thereof.

15. A polymer additive formulation comprising the composition defined in claim 14, wherein said additive composition is present in a form selected from the group consisting of a powder, a pellet, or a liquid, and wherein said composition also comprises at least one thermoplastic polymer, and, optionally, at least one compound selected from the group consisting of plasticizers, acid scavengers, antioxidants, antimicrobials, flame retardants, light stabilizers, antistatic agents, blowing agents, colored pigments, and any combination thereof.

16. A composition comprising at least one acid scavenger compound selected from the group consisting of at least one compound selected from the group consisting of carboxylate salts, dihydrotalcites, and any mixtures thereof and the cis configuration of disodium hexahydrophthalate.

17. A thermoplastic article comprising at least one thermoplastic polymer and the composition as defined in claim 6.

18. The thermoplastic article of claim 16 wherein said polymer comprises polypropylene.

19. A polymer additive formulation comprising at least one composition defined in claim 16, wherein said additive composition is present in a form selected from the group consisting of a powder, a pellet, or a liquid, and wherein said composition also comprises at least one thermoplastic polymer, and, optionally, at least one compound selected from the group consisting of plasticizers, acid scavengers, antioxidants, antimicrobials, flame retardants, light stabilizers, antistatic agents, blowing agents, colored pigments, and any combination thereof.

* * * * *